(12) United States Patent
Rubin (10) Patent No.: US 9,010,927 B2
(45) Date of Patent: Apr. 21, 2015

(54) FOLDABLE EYEWEAR

(71) Applicant: Wayne Rubin, Hewlett Bay Park, NY (US)

(72) Inventor: Wayne Rubin, Hewlett Bay Park, NY (US)

( * ) Notice: Subject to any disclaimer, the term of this patent is extended or adjusted under 35 U.S.C. 154(b) by 0 days.

(21) Appl. No.: 14/472,907

(22) Filed: Aug. 29, 2014

(65) Prior Publication Data

US 2014/0368784 A1    Dec. 18, 2014

Related U.S. Application Data

(63) Continuation-in-part of application No. 13/786,961, filed on Mar. 6, 2013.

(60) Provisional application No. 61/607,326, filed on Mar. 6, 2012, provisional application No. 61/675,130, filed on Jul. 24, 2012.

(51) Int. Cl.
| | |
|---|---|
| *G02C 5/08* | (2006.01) |
| *G02C 5/00* | (2006.01) |
| *G02C 5/22* | (2006.01) |
| *G02C 5/14* | (2006.01) |
| *G02C 5/12* | (2006.01) |

(52) U.S. Cl.
CPC  *G02C 5/006* (2013.01); *G02C 5/22* (2013.01); *G02C 5/08* (2013.01); *G02C 5/14* (2013.01); *G02C 5/12* (2013.01); *G02C 2200/02* (2013.01)

(58) Field of Classification Search
CPC ............ G02C 5/006; G02C 5/08; G02C 5/14; G02C 5/143; G02C 2200/02

USPC ............................................................ 351/63
See application file for complete search history.

(56) References Cited

U.S. PATENT DOCUMENTS

| | | | |
|---|---|---|---|
| 5,768,716 | A | 6/1998 | Porsche |
| 6,783,236 | B2 | 8/2004 | Chou |
| 7,513,617 | B1 * | 4/2009 | Alford ............................ 351/63 |
| 2009/0190088 | A1 | 7/2009 | Strobel |

FOREIGN PATENT DOCUMENTS

GB        2433328        6/2007

OTHER PUBLICATIONS

Office Action dated May 13, 2014 for U.S. Appl. No. 13/786,961.

* cited by examiner

*Primary Examiner* — Huy K Mai
(74) *Attorney, Agent, or Firm* — F. Chau & Associates, LLC (57) ABSTRACT

An eyewear includes a left unit and a right unit coupled with the left unit through a bridge. Each of the left unit and the right unit includes a lens rim and a temple coupled with a side of the lens rim through a first hinge. The temple includes a first temple part and a second temple part coupled with each other via a second hinge. The first temple part and the second temple part are shaped and sized to form an enclosure when the second temple part is folded against the first temple part. The bridge includes a coupling member configured to couple a first bridge part of the bridge with a second bridge part of the bridge when the eyewear is in an unfolded position. Upon further folding of the right unit against the left unit, the enclosure is formed by the temples enclosing the lens rims.

18 Claims, 7 Drawing Sheets

FOLDABLE EYEWEAR

CROSS-REFERENCE TO RELATED APPLICATION

This non-provisional application is a continuation-in-part application of U.S. application Ser. No. 13/786,961, filed on Mar. 6, 2013, which claims priority to U.S. Provisional Application No. 61/607,326, filed on Mar. 6, 2012, and U.S. Provisional Application No. 61/675,130, filed on Jul. 24, 2012, the disclosures of which are incorporated by reference herein in their entirety.

TECHNICAL FIELD

Embodiments of the present invention are directed toward eyewear and particularly to foldable eyewear.

DISCUSSION OF THE RELATED ART

Many limitations currently exist with traditional eyewear regarding their ease of transport, protection of optical surfaces, and when space limitations preclude their ready availability for use. Folding eyewear in their present designs and construction are not designed to preclude the requirement of a separate carrying case to protect optical surfaces with currently sold folding eyewear products. Insofar as the inconvenience of utilizing a separate carrying case or other storage device often results in them not being used, inevitably the optical surfaces of many folding glasses are exposed to damage.

Additionally, present product offering designs and structures do not allow for complete closure of the eyewear's arms to fully protect the folding eyewear's lens or allow the integrity of the eyewear in its folded orientation to secure the lenses and/or the optical surfaces of the lenses from breakage, scratch or other damages, or safeguarding the optical correction attributes of the lenses from diminution or distortion due to damage and debris aggregation. With present designs and structures there is also typically no inclusion of nose guard pieces as is common with standard non-folding eyewear nor do they allow for formation of a complete enclosure utilizing the folding eyewear's arms to encapsulate the lenses for optimal protection and structural strength when folded.

SUMMARY

Embodiments of the present invention provide foldable eyewear that can provide increased portability safety and convenience of deployment without requiring a separate case or storage device, together with greatly augmented protection of the lenses and optical surfaces.

According to an embodiment of the present invention, eyewear is provided. The eyewear includes a left unit and a right unit coupled with the left unit through a first hinge structure. The left unit or the right unit includes a lens rim and a temple coupled with a side of the lens rim through a second hinge structure. The temple has a first temple part and a second temple part coupled with each other via a third hinge structure. The first temple part and the second temple part of the temple are shaped and sized to form an enclosure for at least partially housing the lens rim when the second temple part is folded against the first temple part.

The temple forms a curvature when left unfolded.

The second temple part of the temple includes a tapering front part and a temple end connected to the tapering front part.

Each of the left unit and the right unit further includes a nose guard piece on a side of the lens rim. The nose guard piece of the left unit and the nose guard piece together form a nose guard when the rims are left unfolded.

The nose guard is encapsulated in the enclosure when the eyewear is left in a folded position The eyewear further includes a bridge connecting the lens rim of the left unit with the lens rim of the right unit. The bridge includes a first bridge part extended fruit the lens rim of the left unit and a second bridge part extended from the lens rim of the right unit.

The first bridge part is coupled with the second bridge part via the first hinge structure.

The first bridge part and the second bridge part include opposite-polarity magnets, respectively.

The first hinge structure includes two hinges.

The first temple part of the temple includes a first magnet at a rear side thereof, and the second temple part of the temple includes a second magnet at a front side thereof. The first magnet and the second magnet have opposite polarities. The first magnet is positioned to couple to the second magnet when the temple is left unfolded.

The first temple part of the temple includes a first magnet at a front side thereof, and the second temple part of the temple includes a second magnet at a rear side thereof. The first magnet and the second magnet have opposite polarities. The first magnet is positioned to couple to the second magnet when the temple is left folded.

The third hinge structure includes two hinges.

A vertical width of the temple when the temple is left folded is substantially the same as a vertical width of the lens rim as viewed in a side view.

According to an embodiment of the present invention, an eyewear includes a left unit and a right unit coupled with the left unit through a bridge. Each of the left unit and the right unit includes a lens rim and a temple coupled with a side of the lens rim through a first hinge. The temple includes a first temple part and a second temple part coupled with each other via a second hinge. The first temple part and the second temple part are shaped and sized to form an enclosure when the second temple part is folded against the first temple part. The bridge includes a coupling member configured to couple a first bridge part of the bridge disposed on the left unit with a second bridge part of the bridge disposed on the right unit when the eyewear is in an unfolded position. Upon further folding of the right unit against the left unit, the enclosure is formed by the temples enclosing the lens rims.

The coupling member may include an active coupling mechanism configured to physically interlock the first bridge part with the second bridge part when the eyewear is in the unfolded position.

The active coupling mechanism may be formed of a nanomaterial.

The active coupling mechanism may include a protruding member disposed on one of the first bridge part and the second bridge part, and a receiving member disposed on the other one of the first bridge part and the second bridge part. The receiving member is shaped and sized to receive the protruding member when the eyewear is in the unfolded position.

The protruding member may include a ball-shaped protrusion and the receiving member may include a ball-shaped socket shaped and sized to receive the ball-shaped protrusion when the eyewear is in the unfolded position.

Each of the left unit and the right unit may include a nose guard piece extending from a side of the lens rim. The first temple part of each of the left unit and the right unit may include a groove. The nose guard piece of the left unit and the nose guard piece of the right unit together form a nose guard when the eyewear is in the unfolded position. The groove of the first temple part of the left unit aligns with and receives the nose guard piece of the left unit when the eyewear is in a folded position, and the groove of the first temple part of the right unit aligns with and receives the nose guard piece of the right unit when the eyewear is in the folded position.

An entirety of the second temple part may be disposed below an entirety of the first temple part when the second temple part is folded against the first temple part.

The coupling member may include a magnetic coupling mechanism.

The magnetic coupling mechanism may include a first magnet piece disposed on the first bridge part and a second magnet piece disposed on the second bridge part. The first and second magnet pieces have opposite polarities, and the first and second magnets pieces are positioned on the first and second bridge parts, respectively, to couple with each other when the eyewear is in the unfolded position.

According to an embodiment of the present invention, an eyewear includes a left unit and a right unit coupled with the left unit through a bridge. Each of the left unit and the right unit includes a lens rim and a temple coupled with a side of the lens rim through a first hinge. The temple includes a first temple part and a second temple part coupled with each other via a second hinge. The first temple part and the second temple part are shaped and sized to form an enclosure when the second temple part is folded against the first temple part. The bridge includes an active coupling mechanism configured to physically interlock a first bridge part of the bridge disposed on the left unit with a second bridge part of the bridge disposed on the right unit when the eyewear is in an unfolded position, and a magnetic coupling mechanism configured to couple the first bridge part with the second bridge part when the eyewear is in the unfolded position. Upon further folding of the right unit against the left unit, the enclosure is formed by the temples enclosing the lens rims.

BRIEF DESCRIPTION OF THE DRAWINGS

The embodiments of the present invention will become readily apparent by reference to the following detailed description when considered in conjunction with the accompanying drawings wherein.

DESCRIPTION OF THE EXEMPLARY EMBODIMENTS

Hereinafter, exemplary embodiments of the present invention will be described in detail with reference to the accompanying drawings, wherein the same reference characters or numerals may be used to denote the same or substantially the same elements throughout the specification and the drawings.

It will be understood that when an element or layer is referred to as being "on", "connected to" or "coupled to" another element or layer, it can be directly on, connected or coupled to the other element or layer or intervening elements or layers may be present. Like numbers may refer to like elements throughout the drawings and the specification.

Figure 1:
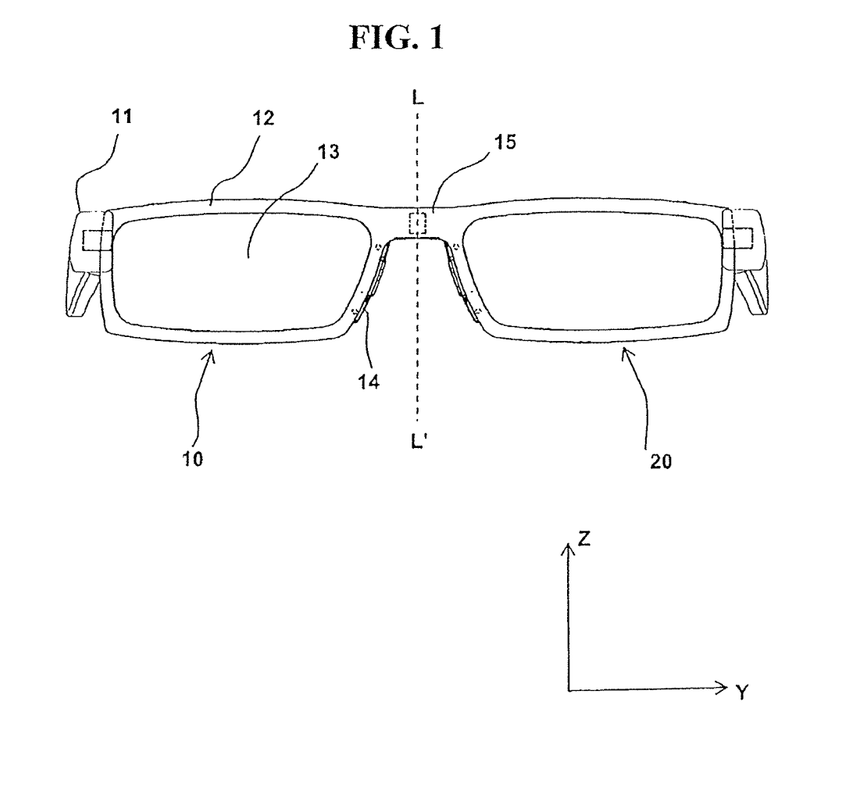
FIG. 1 is a front view illustrating foldable eyewear when left in an unfolded position according to an embodiment of the present invention.
Figure 2:
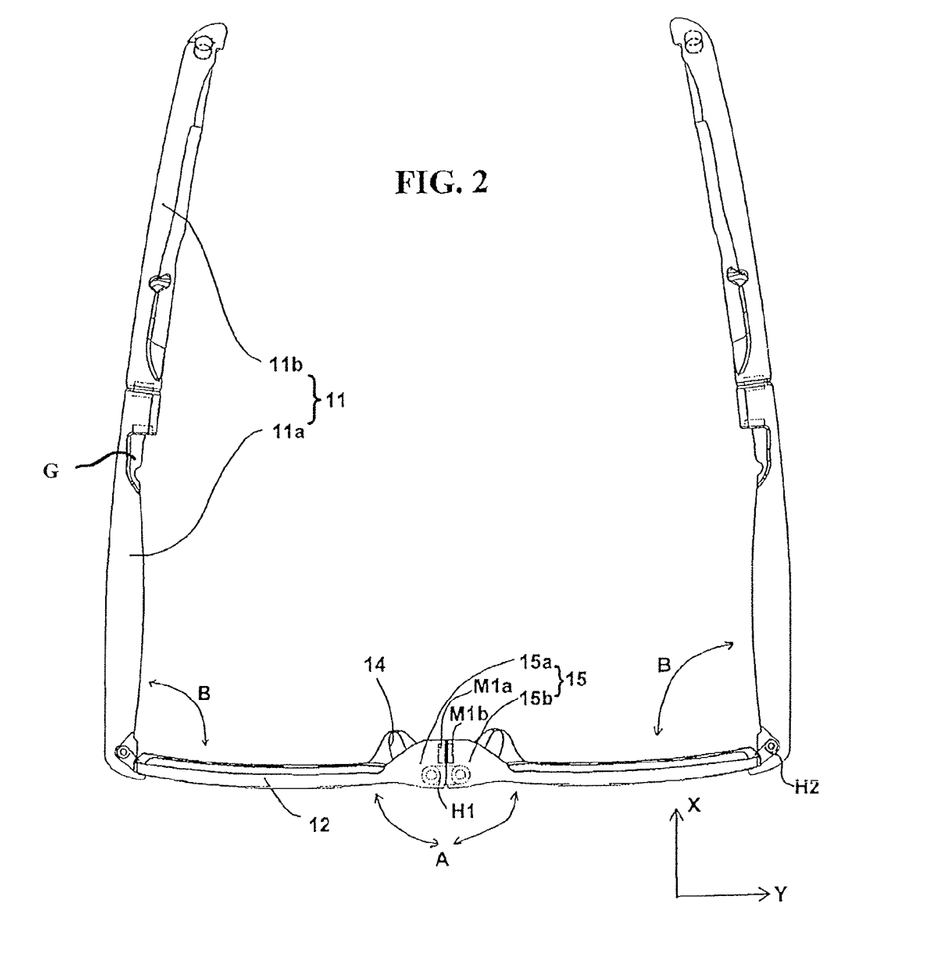
FIG. 2 is a top view of the foldable eyewear of FIG. 1 according to an embodiment of the present invention.
Figure 3:
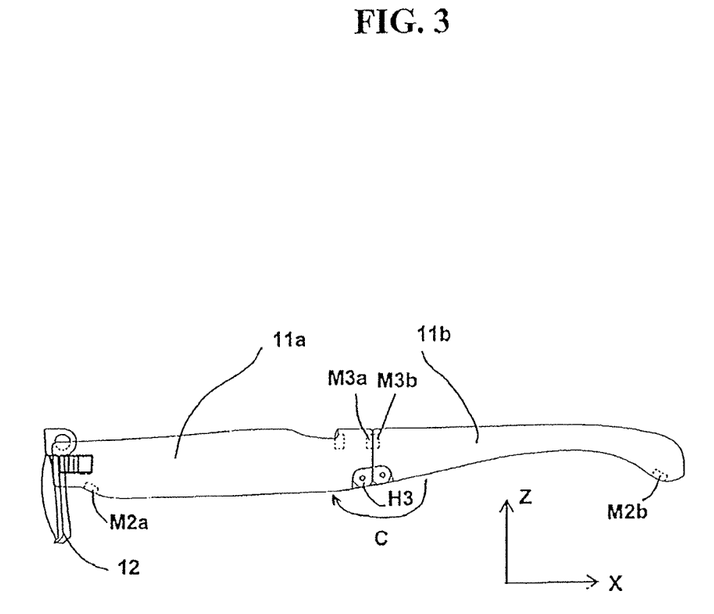
FIG. 3 is a left side view of the foldable eyewear of FIG. 1 according to an embodiment of the present invention.
Figure 4:
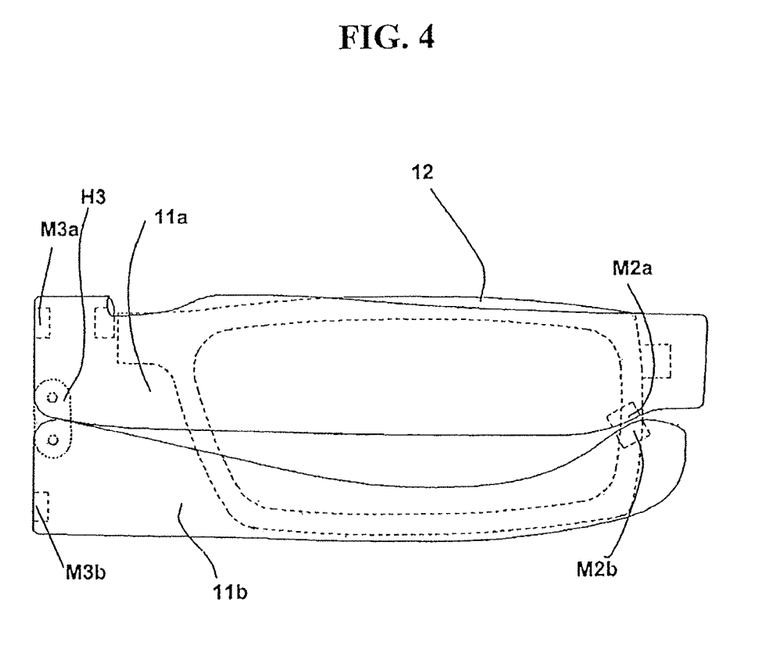
FIG. 4 is a right side view of the foldable eyewear of FIG. 1 when the foldable eyewear is left in a folded position according to an embodiment of the present invention.
Figure 5:
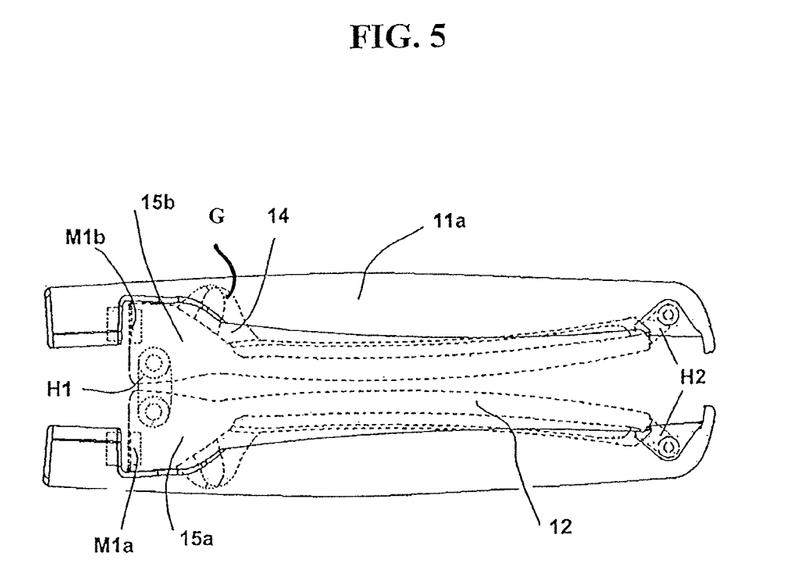
FIG. 5 is a top view of the foldable eyewear of FIG. 1 when the foldable eyewear is left in a folded position according to an embodiment of the present invention.
Figure 6:
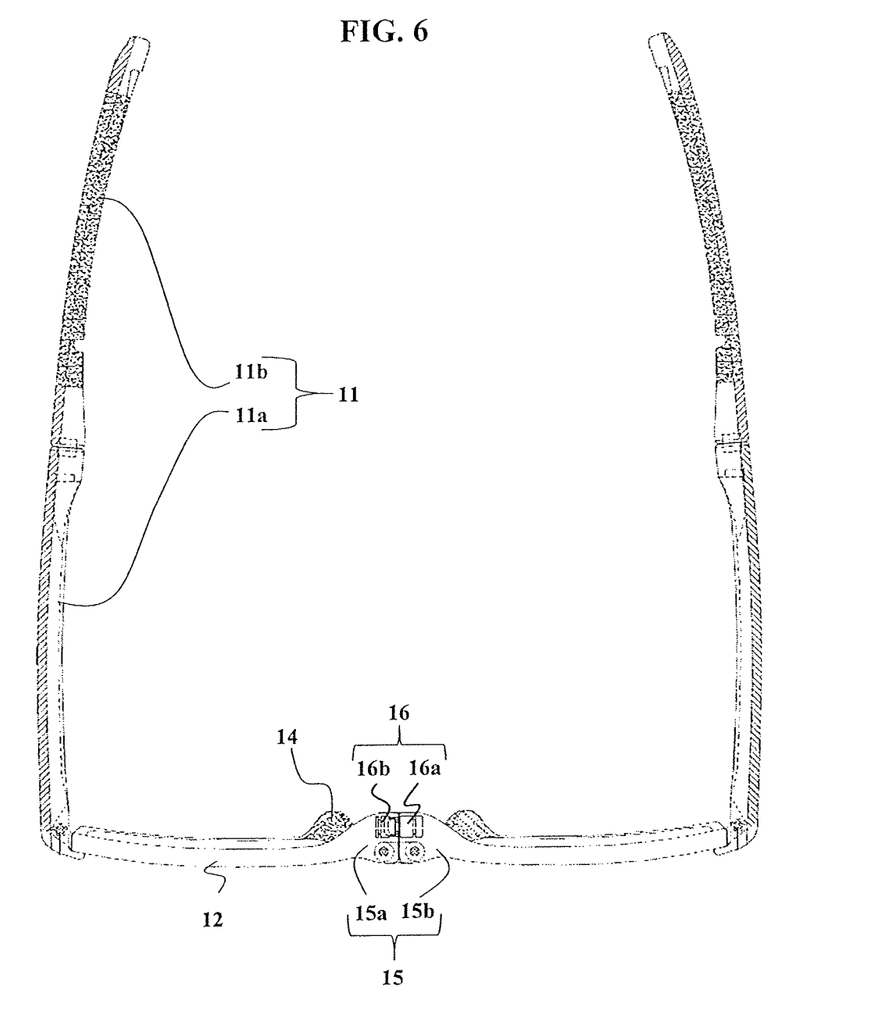
FIG. 6 is a top view of the foldable eyewear of FIG. 1 according to an embodiment of the present invention.
Figure 7:
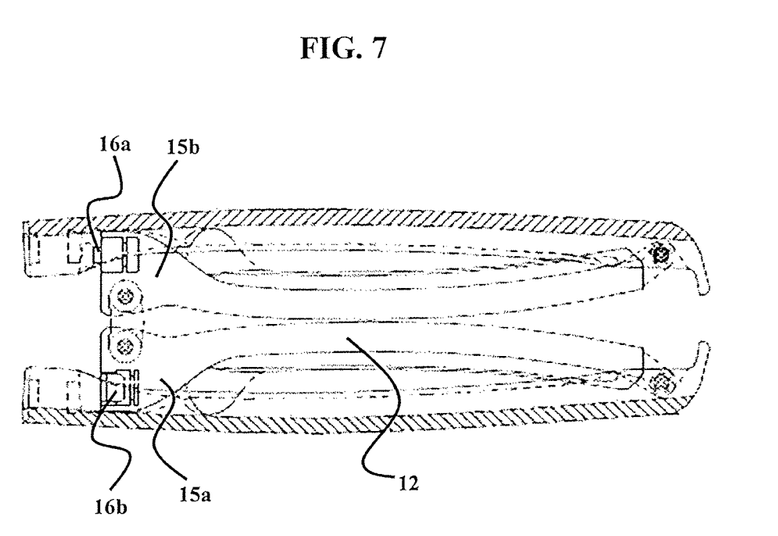
FIG. 7 is top view of the foldable eyewear of FIG. 1 when the foldable eyewear is left in a folded position according to an embodiment of the present invention.

FIG. 1 is a front view illustrating foldable eyewear when left in an unfolded position according to an embodiment of the present invention. FIG. 2 is a top view of the foldable eyewear of FIG. 1 according to an embodiment of the present invention. FIG. 3 is a left side view of the foldable eyewear of FIG. 1 according to an embodiment of the present invention. FIG. 4 is a right side view of the foldable eyewear of FIG. 1 when the foldable eyewear is left in a folded position according to an embodiment of the present invention. FIG. 5 is a top view of the foldable eyewear of FIG. 1 when the foldable eyewear is left in a folded position according to an embodiment of the present invention. FIG. 6 is a top view of the foldable eyewear of FIG. 1 according to an embodiment of the present invention. FIG. 7 is top view of the foldable eyewear of FIG. 1 when the foldable eyewear is left in a folded position according to an embodiment of the present invention.

Referring to FIGS. 1 and 2, the eyewear according to an embodiment of the present invention includes a right unit 10 and a left unit 20. The right unit 10 is substantially symmetrical to the left unit 20 with respect to a virtual line L-L'. The right unit 10 and the left unit 20 may be coupled with each other through a hinge structure H1. The right unit 10 and the left unit 20 may be folded toward each other about hinge H1 in a direction marked with arrows A in FIG. 2.

Hereinafter, the description primarily focuses on the right unit 10 for ease of description, but it may be understood by one of ordinary skilled in the art that the same or substantially the same description may apply to the left unit 20 as well.

The right unit 10 includes a temple 11, a lens rim 12, a lens 13, and a nose guard piece 14. The temple 11 is coupled with the lens rim 12 to be folded in a direction toward the lens rim 12 or to be unfolded in a direction away from the lens rim 12. The temple 11 may be coupled with the lens rim 12 via a hinge structure H2. The temple 11 and the lens rim 12 may be folded toward each other about hinge H2 in a direction marked with arrows B in FIG. 2.

The temple 11 will be described below in greater detail.

The lens rim 12 surrounds the lens 13 along the edge of the lens 13.

The lens rims 12 of the right unit 10 and the left unit 20 are coupled with each other through a bridge 15 via a coupling member. The bridge 15 includes a bridge part 15a extended from the right lens rim 12 and a bridge part 15b extended from the left lens rim 12. The bridge 15 may extend rearward, e.g., in an X-axis direction of FIG. 2. The bridge parts 15a and 15b of the right unit 10 and the left unit 20 are coupled with each other via the hinge structure H1. The coupling member disposed on the bridge 15 couples the first bridge part 15a with the second bridge part 15b when the eyewear is in an unfolded position (e.g., a fully unfolded position). The coupling member may be, for example, an active coupling mechanism such as a snap-in coupling mechanism, or a magnetic coupling mechanism, as described in further detail below. The coupling member is utilized to stably couple the bridge parts 15a and 15b of the right unit 10 and the left unit 20 with each other. Exemplary embodiments may include a single coupling member or multiple coupling members, as described in further detail below.

Referring to FIG. 2, in an exemplary embodiment, the hinge structure H1 of the bridge 15 may include a pair of hinges that are adjacent to each other and together form a coupling structure for the bridge parts 15a and 15b of the left and right lens rims 12. Thus, the left and right lens rims 12 may be folded toward each other in a direction denoted with an arrow as shown in FIG. 2.

Although it is described above that two hinges are used for coupling between the left and right lens rims 12, the embodiments of the present invention are not limited thereto. Alternatively, the left and right lens rims 12 may be coupled with each other via a single hinge.

In an exemplary embodiment, the bridge parts 15a and 15b are coupled to each other using an active coupling mechanism 16, as shown in FIGS. 6 and 7. Herein, an active coupling mechanism 16 refers to a coupling mechanism that includes a mechanical locking mechanism that physically interlocks the bridge parts 15a and 15b with each other. For example, the active coupling mechanism 16 may include cooperating physical coupling members 16a and 16b respectively disposed on the bridge parts 15a and 15b that physically interlock with each other to stabilize the foldable eyewear when in the unfolded position.

Utilization of an active coupling mechanism 16 secures the right unit 10 and the left unit 20 in the unfolded position such that the foldable eyewear is prevented from being unintentionally folded (e.g., folded forward) from a wearer's face while being worn. As a result, according to exemplary embodiments, the foldable eyewear may be folded such that the temples 11 are disposed on the outside of the foldable eyewear when the foldable eyewear is in the folded position, resulting in the formation of an enclosure/casing providing protection for the lenses 13 in the folded position.

In an exemplary embodiment, the active coupling mechanism 16 is a snap-in coupling mechanism, however, the active coupling mechanism 16 is not limited thereto. The cooperating physical coupling members 16a and 16b of the snap-in coupling mechanism 16 may be, for example, a protruding member 16a (e.g., a snap member) disposed on one of the bridge parts 15a and 15b and a receiving member 16b (e.g., a snap recess) disposed on the other one of the bridge parts 15a and 15b. The receiving member 16b is shaped and sized to securely receive the protruding member 16a when the foldable eyewear is in the unfolded position. For example, when the bridge parts 15a and 15b are unfolded as illustrated in FIGS. 2 and 6, the protruding member 16a is snapped into the receiving member 16b, coupling the bridge parts 15a and 15b to each other and securing the foldable eyewear in the unfolded position. Upon applying a sufficient amount of force, the protruding member 16a is disengaged from the receiving member 16b, uncoupling the bridge parts 15a and 15b from each other and allowing the foldable eyewear to enter the folded position as illustrated in FIGS. 5 and 7. The snap-in coupling mechanism 16 prevents the protruding member 16a from being disengaged from the receiving member 16b unless a sufficient amount of force (e.g., an intentional amount of force needed for folding) is applied. In an exemplary embodiment, the protruding member 16a may be, for example, a ball-shaped protrusion and the receiving member 16b may be, for example, a ball-shaped socket shaped and sized to receive the ball-shaped protrusion. In an exemplary embodiment, the active coupling mechanism 16 may be formed using a nanomaterial(s). For example, the active coupling mechanism 16 may be formed entirely of nanomaterials, or may be formed using a combination of nanomaterials and other materials. The inclusion of nanomaterials in the active coupling mechanism 16 may result in a stronger and lighter active coupling mechanism 16.

Utilization of an active coupling mechanism 16, such as, for example, the snap-in coupling mechanism, provides structural integrity to the foldable eyewear when the foldable eyewear is in the unfolded position. For example, in an exemplary embodiment, the active coupling mechanism 16 prevents the foldable eyewear from transitioning from the unfolded position to the folded position unless a sufficient amount of force is intentionally applied in an effort to uncouple the bridge parts 15a and 15b and fold the foldable eyewear. As a result, the active coupling mechanism 16 may prevent the foldable eyewear from unintentionally folding when being worn.

In an exemplary embodiment, the bridge parts 15a and 15b may be coupled to each other using a magnetic coupling mechanism. For example, the bridge parts 15a and 15b may include respective magnet pieces M1a and M1b, for example, behind the hinges as shown in FIG. 2. The magnet pieces M1a and M1b of the bridge parts 15a and 15b may respectively have opposite polarities (N and S or S and N) and may be thus attached to each other when the bridge parts 15a and 15b are unfolded as illustrated in FIG. 2. For example, the magnet pieces M1a and M1b may be respectively positioned on the bridge parts 15a and 15b to couple with each other when the foldable eyewear is in the unfolded position. Accordingly, the magnet pieces M1a and M1b of the bridge parts 15a and 15b may secure the bridge parts 15a and 15b in the unfolded position.

Although it is described above that opposite-polarity magnet pieces M1a and M1b are used for maintaining the unfolded position of the lens rims 12, the embodiments of the present invention are not limited thereto. For example, one of the magnet pieces M1a and M1b of the bridge parts 15a and 15b may be replaced with a magnet-coupling metal while the other is left as a magnet.

According to embodiments of the present invention, the magnet pieces M1a and M1b of the bridge parts 15a and 15b may be attached to outer surfaces of the bridge parts 15a and 15b or may be invisibly embedded in the bridge parts 15a and 15b. Alternatively, the magnet pieces M1a and M1b may be magnetized portions of the bridge parts 15a and 15b but rather than being provided as separate members.

In an exemplary embodiment, the bridge parts 15a and 15b may be coupled to each other using both the active coupling mechanism 16 (e.g., the snap-in coupling mechanism) and the magnetic coupling mechanism described above. For example, in an exemplary embodiment, one of the bridge parts 15a and 15b may include both the protruding member 16a of the snap-in coupling mechanism 16 and the magnet piece M1a of the magnetic coupling mechanism, and the other one of the bridge parts 15a and 15b may include both the receiving member 16b of the snap-in coupling mechanism 16 and the magnet piece M1b of the magnetic coupling mechanism. Utilization of both the active coupling mechanism 16 and the magnetic coupling mechanism provides an additional level of structural integrity to the foldable eyewear when the foldable eyewear is in the unfolded position, thus preventing the foldable eyewear from being unintentionally folded while being worn.

The nose guard piece 14 is positioned at a portion of the lens rim 12 which is located opposite to a portion of the lens rim 12 which is coupled with the temple 11.

The nose guard piece 14 of the right unit 10 and the nose guard piece 14 of the left unit 20 make a pair to thus form a full nose guard to support the eyewear on a wearer's nose. The nose guard piece 14 may be attached, as a separate member, to the portion of the lens rim 12 or may be integrally formed with the lens rim 12.

Although according to one embodiment the eyewear includes the lens rims 12 to fully surround the lenses 13, the embodiments of the present invention are not limited thereto. Alternatively, the lens rims 12 may be omitted or may be provided to partially surround the lenses 13. In other words, the eyewear may have a frameless or partial-frame structure. In such case, the hinge structure H2 used for coupling the temple 11 with the lens rims 12 and the hinge structure H1 for coupling the bridge parts 15a and 15b may be directly attached to the lenses 13. Further, the nose guard pieces 14 may also be attached directly to the lenses 13.

The temple 11 is now described in more detail.

As shown in FIG. 2, the temple 11 may be formed to have a curvature when viewed in a top view. For example, the temples 11 of the right unit 10 and the left unit 20 may be curved toward each other as if the temples 11 hold or surround a wearer's head. This curvature of the temple 11 allows for more secure holding of his/her head while providing him/her with more contact surfaces between the eyewear and the head such that wearing durations and comfort levels exceed or at least conform to industry standard consumer expectations.

The temple 11 includes a first temple part 11a and a second temple part 11b. The first temple part 11a is coupled with the lens rim 12 via the hinge structure H2, and the second temple part 119b is coupled with the first temple part 11a via a hinge structure H3.

The first temple part 11a or the second temple part 11b may be folded to the lens rim 12 about hinge H2, in a direction marked with an arrow B in FIG. 2.

As shown in FIG. 3, the hinge structure H3 through which the first temple part 11a is coupled with the second temple part 119b may include a pair of hinges, one of which is positioned at a rear and lower side of the first temple part 11a, and the other of the hinges is positioned at a front and lower side of the second temple part 11b.

The hinge of the first temple part 11a and the hinge of the second temple part 11b, together, form a coupling structure for the first temple part 11a and the second temple part 11b, so that the second temple part 11b may be folded to the first temple part 11a about hinge H3, in a direction marked with an arrow "C" as illustrated in FIG. 3 to change from a temple that extended in the X direction to a near rectangular shape, with the first temple part 11a on top of the second temple part 11b. Although it is described above that two hinges are used for coupling between the first temple part 11a and the second temple part 11b, the embodiments of the present invention are not limited thereto. Alternatively, the first temple part 11a and the second temple part 11b may be coupled with each other via a single hinge.

Although it is illustrated in FIG. 2 that a single hinge is used for coupling between the lens rim 12 and the first temple part 11a, the embodiments of the present invention are not limited thereto. Alternatively, the same or substantially the same hinge structure as used between the lens rims 12 or between the first temple part 11a and the second temple part 119b may be also used for coupling the lens rim 12 and the first temple part 11a.

The first temple part 11a includes magnet pieces M2a and M3a, one of which is positioned at a front and lower side while another one is positioned at a rear and upper side. For example, the first temple part 11a includes a first magnet piece M2a at a front and lower side thereof and a second magnet piece M3a at a rear and upper side thereof.

The second temple part 11b also includes magnet pieces M3b and M2b, one of which is positioned at a front and upper side while another one is positioned at a rear and lower side. For example, the second temple part 11b includes a first magnet piece M3b at a front and upper side thereof and a second magnet piece M2b at a rear and lower side thereof.

The first magnet piece M2a of the first temple part 11a and the second magnet piece M2b of the second temple part 11b have opposite polarities (N and S or S and N), and may be thus attached to each other when the second temple part 119b is left folded with the first temple part 11a. As such, the magnet pieces M2a and M2b of the first temple part 11a and the second temple part 119b may maintain a secure folded position of the first temple part 11a and the second temple part 11b.

The second magnet piece M3a of the first temple part 11a and the first magnet piece M3b of the second temple part 119b have opposite polarities (N and S or S and N), and may be thus attached to each other when the second temple part 119b is left unfolded against the first temple part 11a. As such, the magnet pieces M3a and M3b of the first temple part 11a and the second temple part 11b may maintain a secure unfolded position of the first temple part 11a and the second temple part 11b.

Although it is described above that opposite-polarity magnet pieces are used for maintaining a folded or unfolded position of the temple 11, the embodiments of the present invention are not limited thereto. For example, the first and second magnet pieces M2a and M3a or M3b and M2b of the first temple part 11a or the second temple part 11b may be replaced with a metal piece that may be magnetically coupled to a magnet while their respective corresponding parts of the counterpart temple part 119b or 11a are formed of a magnet. One of the first and second magnet pieces M2a and M3a or M3b and M2b may be replaced with a magnet-coupling metal piece, with its counterpart formed of a magnet.

According to embodiments of the present invention, the first and second magnet pieces M2a and M3a or M3b and M2b of the first temple part 11a or the second temple part 11b may be attached to an outer surface of the first temple part 11a or the second temple part 119b or may be invisibly embedded in the first temple part 11a or the second temple part 11b. Alternatively, the first magnet piece M2a or M3b and the second magnet piece M3a or M3b may be magnetized portions of the first temple part 11a or second temple part 119b but rather than being provided as separate members.

As shown in FIG. 3, when viewed in a side view, the temple 11 forms a streamlined shape for better wearable comfort. For example, the second temple part 11b of the temple 11 gradually tapers in a direction away from the lens rim 12 (or, x-axis direction) before the temple end. The temple end is shaped to be bent downward (or, −z-axis direction) for smoothly holding a wearer's ear.

Referring back to FIG. 2, an upper edge of the first temple part 11a is extended from an inner sidewall of the first temple part 11a in a direction substantially perpendicular to the inner sidewall of the first temple part 11a (e.g., in the −y axis direction). The first temple part 11a includes a protrusion at a rear side thereof, and the protrusion may include a magnet or magnet coupling with a metal piece as its counterpart to form a magnet and a hinge.

A groove G may be formed on the inner sidewall of the first temple part 11a as shown in FIGS. 2 and 5. In an exemplary embodiment, the groove G may be formed at the upper edge of the first temple part 11a right before the protrusion so that the top surface of the bridge part may be exposed, at least partially, when the eyewear is left in the full folded position as shown in FIG. 5. The groove G is formed to correspond to the nose guard piece 14. For example, the groove G is shaped and sized to receive the nose guard piece 14 when the foldable eyewear is in the folded position (e.g., the fully folded position) as shown in FIG. 5. Inclusion of the groove G allows for the first temple part 11a to be positioned closer to the lens rim 12 when the foldable eyewear is in the folded position, resulting in a thinner profile when the foldable eyewear is in the folded position. For example, since the groove G is shaped and sized to receive the nose guard piece 14, the nose guard piece 14 rests within the groove G when the foldable eyewear in the folded position, rather than pushing up against the first temple part 11a when the foldable eyewear in the folded position. The groove G aligns with and receives the nose guard piece 14 when the foldable eyewear is in the folded position, as shown in FIG. 5.

The first temple part 11a and the second temple part 11b, when folded, form an enclosure/outer casing that encloses and protects the folded lens structure as shown in FIG. 5.

Therefore, the folded lens rims 12 including the nose guard and the lenses 13 are encapsulated in the enclosure, thus effectively protecting the same.

Referring to FIG. 4, the vertical width of the folded temple 11 may be substantially the same as the vertical width of the lens rim 12, and thus, a majority portion of the lens rim 12 and the lens 13 is hidden by the folded temple 11 as viewed in a side view, with a relatively smaller portion thereof is exposed to the outside due to the streamlined and tapering shape of the temple 11.

According to exemplary embodiments of the present invention, the curvature of the temples 11 allows an eyewear to remain comfortably and securely on the wearer's head. The enclosure/casing formed when the first temple part 11a and the second temple part 119b of temples 11 are folded provides protection for the included nose guard, rims, and lenses. According to exemplary embodiments, when in the folded position, the second temple part 11b may be disposed entirely below the first temple part 11a, as shown in FIG. 4. That is, in an exemplary embodiment, an entirety of the second temple part 119b is disposed below an entirety of the first temple part 11a when the second temple part 119b is folded against the first temple part 11a (e.g., while the foldable eyewear is in the folded position). Disposing the second temple part 11b entirely below the first temple part 11a while in the folded position results in an increased coverage area of the formed enclosure/casing, increasing the protection of the lenses 13 when the foldable eyewear is in the folded position.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An eyewear, comprising:
   a left unit; and
   a right unit coupled with the left unit through a bridge, wherein each of the left unit and the right unit comprises:
      a lens rim; and
      a temple coupled with a side of the lens rim through a first hinge, the temple having a first temple part and a second temple part coupled with each other via a second hinge, wherein the first temple part and the second temple part are shaped and sized to form an enclosure when the second temple part is folded against the first temple part,
   wherein the bridge comprises a coupling member configured to couple a first bridge part of the bridge disposed on the left unit with a second bridge part of the bridge disposed on the right unit when the eyewear is in an unfolded position,
   wherein upon further folding of the right unit against the left unit, the enclosure is formed by the temples enclosing the lens rims.

2. The eyewear of claim 1, wherein the coupling member comprises an active coupling mechanism configured to physically interlock the first bridge part with the second bridge part when the eyewear is in the unfolded position.

3. The eyewear of claim 2, wherein the active coupling mechanism comprises:
   a protruding member disposed on one of the first bridge part and the second bridge part; and
   a receiving member disposed on the other one of the first bridge part and the second bridge part,
   wherein the receiving member is shaped and sized to receive the protruding member when the eyewear is in the unfolded position.

4. The eyewear of claim 3, wherein the protruding member comprises a ball-shaped protrusion and the receiving member comprises a ball-shaped socket shaped and sized to receive the ball-shaped protrusion when the eyewear is in the unfolded position.

5. The eyewear of claim 3, wherein each of the left unit and the right unit further comprises:
   a nose guard piece extending from a side of the lens rim,
   wherein the first temple part of each of the left unit and the right unit comprises a groove,
   wherein the nose guard piece of the left unit and the nose guard piece of the right unit together form a nose guard when the eyewear is in the unfolded position,
   wherein the groove of the first temple part of the left unit aligns with and receives the nose guard piece of the left unit when the eyewear is in a folded position, and the groove of the first temple part of the right unit aligns with and receives the nose guard piece of the right unit when the eyewear is in the folded position.

6. The eyewear of claim 3, wherein an entirety of the second temple part is disposed below an entirety of the first temple part when the second temple part is folded against the first temple part.

7. The eyewear of claim 2, wherein the active coupling mechanism comprises a nanomaterial.

8. The eyewear of claim 1, wherein the coupling member comprises a magnetic coupling mechanism.

9. The eyewear of claim 8, wherein the magnetic coupling mechanism comprises:
   a first magnet piece disposed on the first bridge part; and
   a second magnet piece disposed on the second bridge part,
   wherein the first and second magnet pieces have opposite polarities, and the first and second magnets pieces are positioned on the first and second bridge parts, respectively, to couple with each other when the eyewear is in the unfolded position.

10. The eyewear of claim 9, wherein each of the left unit and the right unit further comprises:
    a nose guard piece extending from a side of the lens rim,
    wherein the first temple part of each of the left unit and the right unit comprises a groove,
    wherein the nose guard piece of the left unit and the nose guard piece of the right unit together form a nose guard when the eyewear is in the unfolded position,
    wherein the groove of the first temple part of the left unit aligns with and receives the nose guard piece of the left unit when the eyewear is in a folded position, and the groove of the first temple part of the right unit aligns with and receives the nose guard piece of the right unit when the eyewear is in the folded position.

11. The eyewear of claim 9, wherein an entirety of the second temple part is disposed below an entirety of the first temple part when the second temple part is folded against the first temple part.

12. An eyewear, comprising:
a left unit; and
a right unit coupled with the left unit through a bridge, wherein each of the left unit and the right unit comprises:
    a lens rim; and
    a temple coupled with a side of the lens rim through a first hinge, the temple having a first temple part and a second temple part coupled with each other via a second hinge, wherein the first temple part and the second temple part are shaped and sized to form an enclosure when the second temple part is folded against the first temple part,
wherein the bridge comprises:
    an active coupling mechanism configured to physically interlock a first bridge part of the bridge disposed on the left unit with a second bridge part of the bridge disposed on the right unit when the eyewear is in an unfolded position; and
    a magnetic coupling mechanism configured to couple the first bridge part with the second bridge part when the eyewear is in the unfolded position,
wherein upon further folding of the right unit against the left unit, the enclosure is formed by the temples enclosing the lens rims.

13. The eyewear of claim 12, wherein the magnetic coupling mechanism comprises:
a first magnet piece disposed on the first bridge part; and
a second magnet piece disposed on the second bridge part,
wherein the first and second magnet pieces have opposite polarities, and the first and second magnets pieces are positioned on the first and second bridge parts, respectively, to couple with each other when the eyewear is in the unfolded position.

14. The eyewear of claim 13, wherein the active coupling mechanism comprises:
a protruding member disposed on one of the first bridge part and the second bridge part; and
a receiving member disposed on the other one of the first bridge part and the second bridge part,
wherein the receiving member is shaped and sized to receive the protruding member when the eyewear is in the unfolded position.

15. The eyewear of claim 14, wherein the protruding member comprises a ball-shaped protrusion and the receiving member comprises a ball-shaped socket shaped and sized to receive the ball-shaped protrusion when the eyewear is in the unfolded position.

16. The eyewear of claim 14, wherein each of the left unit and the right unit further comprises:
a nose guard piece extending from a side of the lens rim,
wherein the first temple part of each of the left unit and the right unit comprises a groove,
wherein the nose guard piece of the left unit and the nose guard piece of the right unit together form a nose guard when the eyewear is in the unfolded position,
wherein the groove of the first temple part of the left unit aligns with and receives the nose guard piece of the left unit when the eyewear is in a folded position, and the groove of the first temple part of the right unit aligns with and receives the nose guard piece of the right unit when the eyewear is in the folded position.

17. The eyewear of claim 14, wherein an entirety of the second temple part is disposed below an entirety of the first temple part when the second temple part is folded against the first temple part.

18. The eyewear of claim 12, wherein the active coupling mechanism comprises a nanomaterial.

* * * * *